(No Model.)

A. DRAYTON.
SUSPENSION CHAIN.

No. 477,522. Patented June 21, 1892.

Fig. 1.

Fig. 2.

Witnesses
Albert B. Blackwood

Inventor
Alvan Drayton
By his Attorney

UNITED STATES PATENT OFFICE.

ALVAN DRAYTON, OF NEW YORK, N. Y.

SUSPENSION-CHAIN.

SPECIFICATION forming part of Letters Patent No. 477,522, dated June 21, 1892.

Application filed January 22, 1892. Serial No. 418,913. (No model.)

*To all whom it may concern:*

Be it known that I, ALVAN DRAYTON, a citizen of the United States of America, residing in New York city, in the county and State of New York, have invented a new and useful Suspension-Chain for Bird-Cages, of which the following is a specification.

My invention relates to improvements in adjustable suspension-chains for bird-cages; and the object is to provide a suspension-chain which can be readily and conveniently adjusted to hold a bird-cage at any desired height or by which the cage may be raised or lowered without detaching it from the chain.

In the accompanying drawings, Figure 1 is a view showing the chain suspended from a support and connected to the top of a cage. Fig. 2 is a detail of the holding-sleeve.

A designates the chain, having a ring 1 secured in the free end and at the lower end provided with a spring 2, terminating in a hook or ring to engage with the ring or hook of the bird-cage, the chain being doubled at its upper portion to hang on a support, substantially as seen in the drawings in Fig. 1.

B designates a sleeve, preferably made of coiled wire for ornamentation and to give it a resilient function and provided with an arm 3, having its end secured to the free end of the chain, as shown. This sleeve B is made larger than the chain and has the member or part of the chain from which the cage is suspended passed loosely through it. The chain above the point of connection to the sleeve being doubled forms a loop, which is arranged on the support over which it travels when the cage is raised or lowered. This arrangement and construction of the loose sleeve causes it to be drawn or canted to an angle on the member leading to the cage and hold it in any position of adjustment to which it may be drawn or run in adjusting the height of the cage.

To raise the cage, the free end of the chain to which the arm 3 of the sleeve is attached is grasped and drawn down, which action releases the hold of the sleeve on the chain and the movement can be proceeded with until the desired height is reached. Then on releasing the force the sleeve by the weight of the cage is canted or pulled to an angle to lock the chain at that point. To lower the cage, the sleeve is drawn into a vertical position, when the cage will descend and may be stopped at any point desired.

Having thus described my invention, as required by the statute, what I claim, and desire to secure by Letters Patent, is—

1. The combination, with an adjustable suspending-chain doubled at its upper portion to hang on a support, of a sleeve having an arm fastened to one member of the chain and having the other member of the chain passed through the sleeve, whereby the weight of a suspended object will cause the sleeve to cant and hold the member of the chain in the sleeve at any adjusted position, substantially as described.

2. In an adjustable suspension-chain for bird-cages, the chain A, provided with means at one end to connect it to a bird-cage and doubled at its upper portion to hang on a support, combined with a sleeve B, formed with an arm 3, fastened to the free end of the doubled part of the chain and having the other member of the chain passed loosely through the sleeve, substantially as and for the purpose specified.

In witness whereof I have hereunto set my hand in the presence of two attesting witnesses.

ALVAN DRAYTON.

Attest:
H. W. LAWRENCE,
EDWARD SMITH.